United States Patent
Harvey

(10) Patent No.: US 11,296,863 B2
(45) Date of Patent: Apr. 5, 2022

(54) BLOCKCHAIN ENTERPRISE DATA MANAGEMENT

(71) Applicant: Bank of America Corporation, Charlotte, NC (US)

(72) Inventor: Ann Charlot Hunaes Harvey, Iron Station, NC (US)

(73) Assignee: Bank of America Corporation, Charlotte, NC (US)

(*) Notice: Subject to any disclaimer, the term of this patent is extended or adjusted under 35 U.S.C. 154(b) by 584 days.

(21) Appl. No.: 15/861,890

(22) Filed: Jan. 4, 2018

(65) Prior Publication Data

US 2019/0207750 A1    Jul. 4, 2019

(51) Int. Cl.
*H04L 9/06* (2006.01)
*H04L 29/08* (2006.01)
*H04L 67/104* (2022.01)

(52) U.S. Cl.
CPC .......... *H04L 9/0637* (2013.01); *H04L 9/0643* (2013.01); *H04L 67/104* (2013.01); *G06Q 2220/00* (2013.01); *H04L 2209/38* (2013.01)

(58) Field of Classification Search
None
See application file for complete search history.

(56) References Cited

U.S. PATENT DOCUMENTS

| | | |
|---|---|---|
| 5,561,793 A | 10/1996 | Bennett et al. |
| 7,779,258 B2 | 8/2010 | Arnold et al. |
| 7,836,078 B2 | 11/2010 | Dettinger et al. |
| 9,298,806 B1 | 3/2016 | Vessenes et al. |
| 9,397,985 B1 | 7/2016 | Seger, II et al. |
| 2011/0238437 A1 | 9/2011 | Zhou et al. |
| 2016/0261404 A1 | 9/2016 | Ford et al. |
| 2016/0292680 A1 | 10/2016 | Wilson, Jr. et al. |
| 2016/0300234 A1* | 10/2016 | Moss-Pultz ............. G06F 21/64 |
| 2017/0041296 A1 | 2/2017 | Ford et al. |
| 2017/0132625 A1* | 5/2017 | Kennedy ............. G06F 16/2379 |
| 2017/0140375 A1 | 5/2017 | Kunstel |
| 2017/0178237 A1 | 6/2017 | Wong |
| 2017/0220815 A1 | 8/2017 | Ansari et al. |

(Continued)

OTHER PUBLICATIONS

Suraj Kumar, Merkle Trees—Introduction to Blockchain, Dec. 10, 2017 (Year: 2017).*

(Continued)

*Primary Examiner* — Jacob C. Coppola
*Assistant Examiner* — Timothy Paul Sax
(74) *Attorney, Agent, or Firm* — Banner & Witcoff, Ltd.

(57) ABSTRACT

Methods and systems for enterprise data management using a blockchain are described herein. A distributed peer-to-peer network may manage a blockchain corresponding to a data field. A first computing device may receive data from the data field. The first computing device may determine the blockchain corresponding to the data field and evaluate blockchain entries of the blockchain. Such blockchain entries may comprise information regarding data lineage, privacy, or the like. Based on the blockchain entries evaluated, the computing device may determine whether to store the data received. In response to determining to transfer at least a portion of the data to a second computing device, the first computing device may generate a blockchain entry and cause it to be added to the blockchain.

17 Claims, 9 Drawing Sheets

(56) References Cited

U.S. PATENT DOCUMENTS

| | | | |
|---|---|---|---|
| 2017/0295232 A1* | 10/2017 | Curtis | G06F 9/466 |
| 2018/0060496 A1 | 3/2018 | Bulleit et al. | |
| 2018/0129699 A1* | 5/2018 | Gould | G06F 16/2365 |
| 2018/0276663 A1* | 9/2018 | Arora | H04L 9/3247 |
| 2018/0349706 A1* | 12/2018 | Hodgson | G11B 27/10 |
| 2018/0373600 A1* | 12/2018 | Xu | G06F 3/0619 |
| 2019/0042989 A1 | 2/2019 | Scott | |
| 2019/0097807 A1 | 3/2019 | Mahanta et al. | |
| 2019/0102089 A1* | 4/2019 | Ober | G06F 3/0643 |
| 2019/0138627 A1* | 5/2019 | Raman | G06F 8/36 |
| 2019/0188657 A1* | 6/2019 | Arora | G06Q 20/389 |
| 2019/0200218 A1* | 6/2019 | Redberg | H04L 9/3213 |
| 2020/0099534 A1* | 3/2020 | Lowagie | H04L 9/0643 |

OTHER PUBLICATIONS

Maurizio Morisio, "Designing a Blockchain Network of Universities", 2018 (Year: 2018).*
Dec. 5, 2019—U.S. Non-Final Office Action—U.S. Appl. No. 15/861,901.
May 18, 2020—U.S. Final Office Action—U.S. Appl. No. 15/861,901.
Sep. 21, 2020—U.S. Non-Final Office Action—U.S. Appl. No. 15/861,901.
Mar. 10, 2021—U.S. Final Office Action—U.S. Appl. No. 15/861,901.

* cited by examiner

BLOCKCHAIN ENTERPRISE DATA MANAGEMENT

FIELD

Aspects described herein generally relate to the management of enterprise data using blockchains to track data lineage of data within an organization.

BACKGROUND

Advances in computing technology and corporate complexity have increased the volume of data received and processed by enterprises. For example, a car showroom may continually collect significant amounts of data from potential customers, such as customer names, tastes, budgets, addresses, and the like. Such information may be stored in a variety of servers and permanent storage, be processed by numerous parts of the organization (e.g., by a salesman, finance officer, front desk clerk, etc.), and the like.

This increase in the volume and frequency of data may make tracking data lineage particularly difficult, especially where speedy data transmission is desired. For instance, a car showroom may know a customer's address, but may not know where it acquired that information (e.g., from the customer entering the content into an online form) This concern becomes even greater as such information is used and processed: for instance, a customer's name may have been written into an online form, processed by a data entry clerk into a database, processed by the database to convert the name into a standard format, and sent to a second database before ultimately being accessed by a salesman. The salesman may not be able to determine where such information was acquired such that, if the information is erroneous, the source of the erroneous information may not be easily determined. Determination of the individual transmission and processing steps underwent by particular data may be impossible or take significant effort.

Relatedly, this increase in volume and frequency of data may make maintaining data privacy difficult. For example, a high-end car customer may prefer their address remain secret, but subsequent processing of the address by enterprise systems may fail to indicate that the address remain a secret. As such, while the car showroom may intend to keep the address private, a later user of the data (e.g., by a showroom accountant exporting the data into a spreadsheet) may fail to protect the privacy of the address.

While some enterprises track data lineage information and privacy information centrally (e.g., using a server), such solutions may be vulnerable to failure or compromise. For example, if a car showroom maintains a central data lineage server, failure of the server may result in loss of all data lineage information. Additionally, should the enterprise be compromised, privacy information (e.g., indications that data should be private) may be modified or hidden to obfuscate unauthorized data movement inside or outside the enterprise.

There is thus an ongoing need for methods to better receive, track, and process data, with a particular eye to tracking data lineage, privacy, and other such characteristics.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To better receive, track, and process data, and to overcome other limitations that will be apparent upon reading and understanding the present specification, aspects described herein are directed towards the use of a blockchain for enterprise data management.

A form may be established with a plurality of data fields. A computing device, upon receipt of data (e.g., an address, a file, a telephone number, etc.) from a data field of the form, may determine a blockchain corresponding to the data field. Such a blockchain may comprise a plurality of blockchain entries containing information corresponding to, for instance, data lineage, data privacy/security, data validation rules, or the like. The computing device may analyze the entries and determine whether to store data based on, for instance, whether the computing device can verify the origin and movement of the data throughout an enterprise. If the computing device determines to transfer the stored data to a second computing device, it may create a corresponding blockchain entry and cause it to be added to the blockchain. The computing device may then transfer the data to the second computing device. Thus, according to some aspects of the present disclosure, blockchain entries may be created corresponding to the movement or processing of data, thereby allowing other computing devices to determine information (e.g., data lineage, privacy, etc.) of the data.

The blockchain may correspond to one or more data fields of a form and may comprise blockchain entries, each comprising a variety of information which may be useful for enterprise data management. As suggested above, the blockchain entries may correspond to data lineage such that the flow of data throughout an enterprise may be determined. According to some aspects, blockchain entries may comprise a privacy level, and a computing device may store data based on determining that corresponding privacy level(s) meet a threshold. Blockchain entries may comprise data validation rules such that a computing device may store and/or process data based on determining that the data meets the validation rules. Blockchain entries may comprise data modification information such that computing devices may determine how, if at all, data has been modified within or outside of the enterprise. Blockchain entries may be evaluated to determine a likelihood of compromise such that, for instance, inconsistencies in the blockchain may suggest problems with data flow, device failure, and the like.

According to some aspects, A blockchain and data flows may be established before data is transmitted. For instance, a network device or administrator may establish a blockchain and blockchain entries indicating data lineage for a data field such that data may flow in a predefined manner. Blockchain entries may comprise rules for data flow, such as a rule defining which devices may receive and process data from a particular data field. Data may be tracked throughout an enterprise to ensure that it flows in a manner established in the blockchain. Some blockchain entries may thereby relate to the intake of data into an enterprise, whereas others may relate to the flow of data throughout an enterprise. Additionally, computing devices may be configured to require an approval message from the blockchain before sending and/or receiving data.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
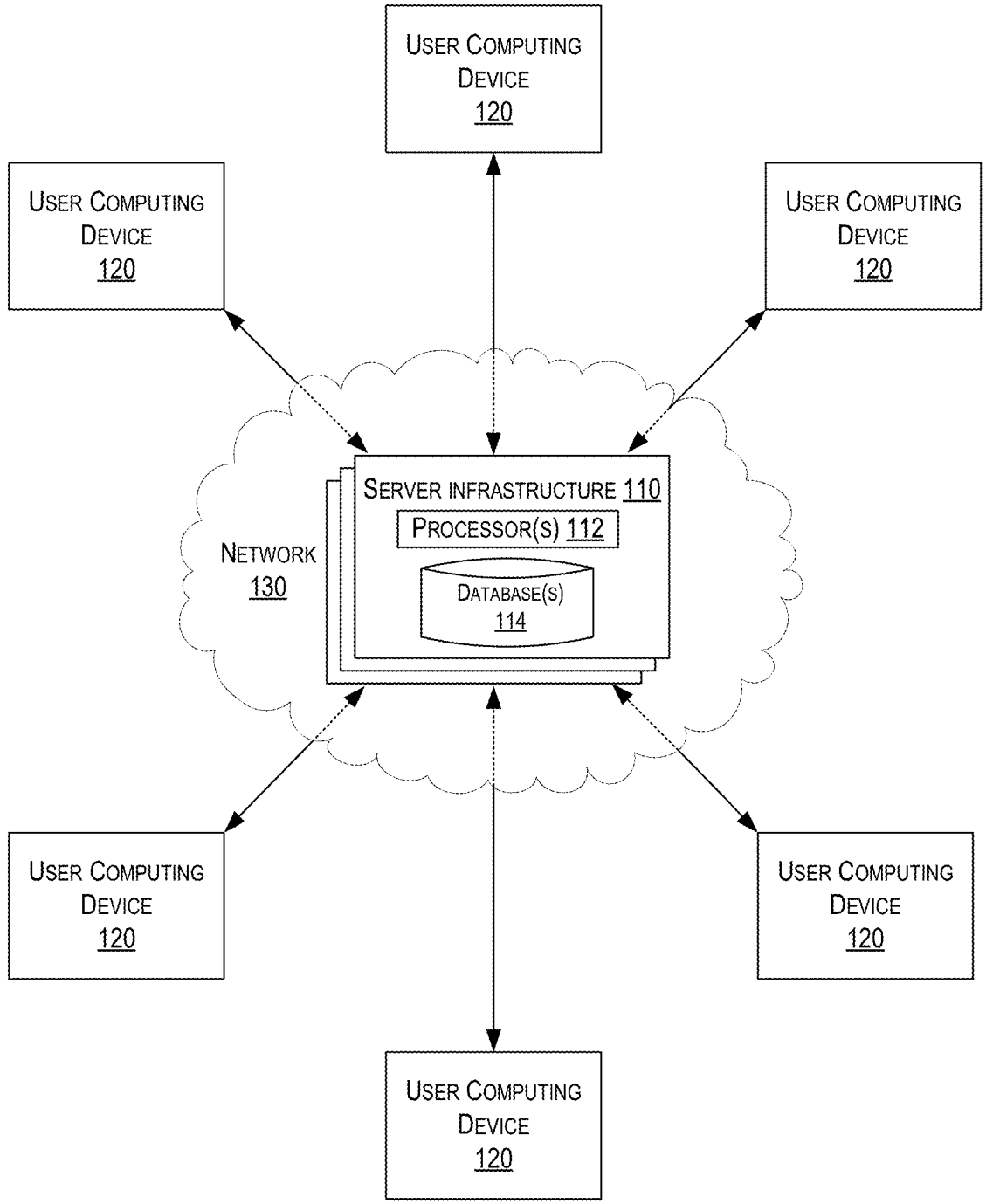
FIG. 1 depicts an illustrative example of centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As a general introduction to the subject matter described in more detail below, aspects described herein are directed towards managing enterprise data using a decentralized peer-to-peer system implementing, for example, a blockchain.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, a wallet associated with the user may indicate that the requested network-specific function has been performed in some implementations.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, election voting, medical records, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations performed by a "smart contract," which may be one or more algorithms and/or programs associated with one or more nodes within a decentralized P2P network. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to each of the computing devices comprising server infrastructure 110. The local network connecting auto identification and mapping computing platform 120, system infrastructure 130, and/or post-performance review computing device 140 may interface with network 150 and enable communication with user computing devices 110A-110N.

Furthermore, in some embodiments, centralized computer system 100 may include a plurality of computer systems arranged in an operative networked communication with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
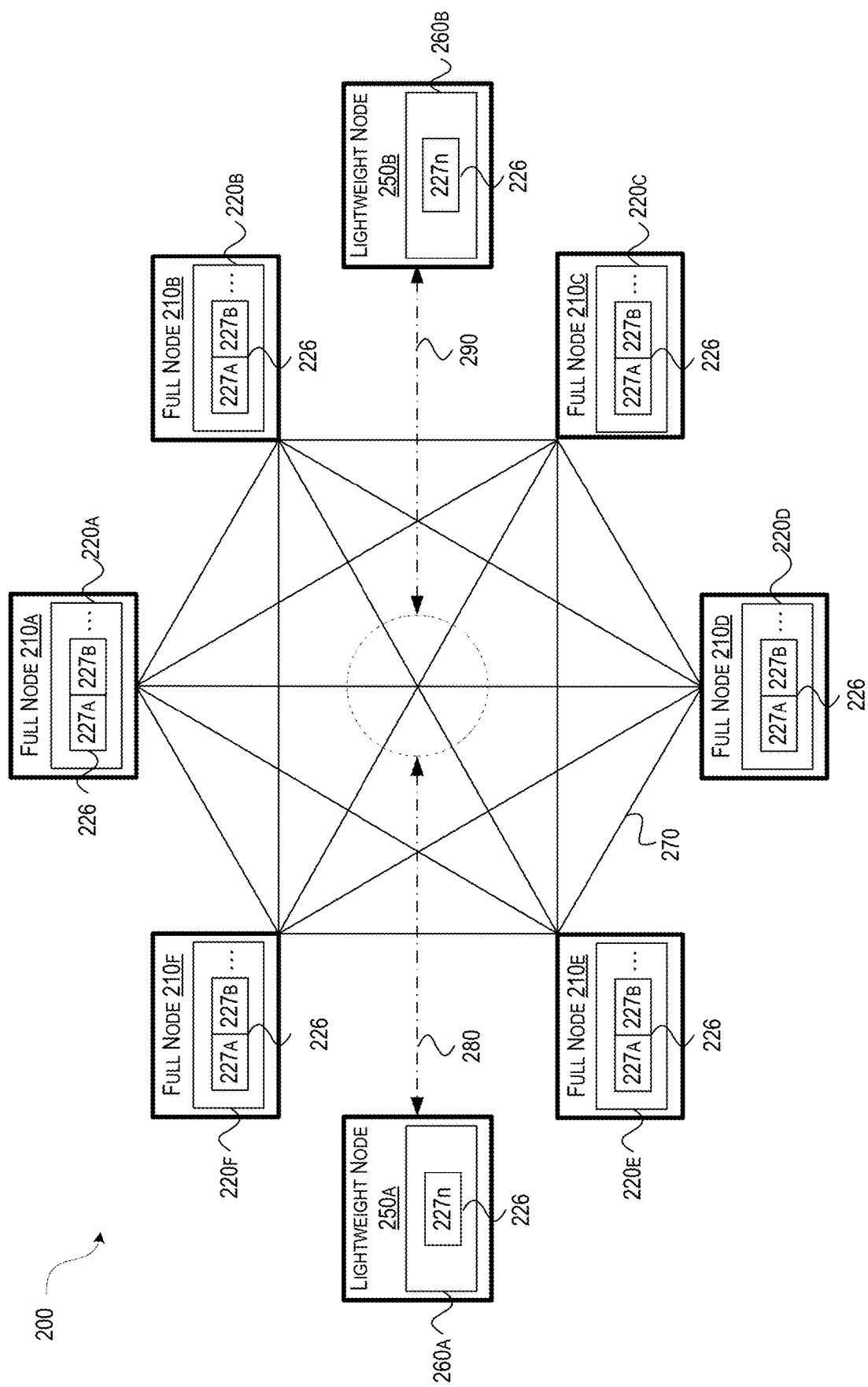
FIG. 2 depicts an illustrative example of decentralized P2P computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and create decentralized P2P network 270. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270.

Lightweight node computing devices 250A and 250B may request execution of network functions related to blockchain 226 in decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to blockchain 226 in decentralized P2P network 270, which may entail a data transfer from a private/public key associated with lightweight node computing device 250A to a private/public key associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with lightweight node computing device 250B. Processors of lightweight node computing device 250A may execute digital signature algorithms to digitally sign balance sheet transaction network function request 280 with the private key associated with lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280, in turn, may be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the public key of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the selected full node computing device to be used as the nonce.

In embodiments in which the consensus algorithm is delegated proof of stake (e.g., DPoS), a group of delegates are chosen from full node computing devices 210A-210F by each of computing devices 210A-210F, wherein full node computing devices 210A-210F are allowed to vote on delegates based on balance sheet holdings associated with the respective public keys. Full node computing devices 210A-210F, however, may not vote for themselves to be delegates. Once the group of delegates are chosen, the group of delegates from full node computing devices 210A-210F select a public key associated with one of full node computing devices 210A-210F to serve as the nonce. Again, each of the delegates are prohibited from selecting themselves and their respective public key from serving as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing balance sheet transaction network function request 280. After the new block has been added to blockchain 226, balance sheet transaction network function request 280 may be considered to be executed and the data transfer from the private/public key associated with lightweight node computing device 250A to the private/public key associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function, in turn, may be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to blockchain 226 in decentralized P2P network 270, which may facilitate a dual data transfer between a private/public key associated with lightweight node computing device 250B and a private/public key associated lightweight node computing device 250A. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 260A for executing smart contract operation network function request 290. After the new block has been added to blockchain 226, smart contract operation request 290 may be considered to be executed and the data transfer from the private/public key associated with lightweight node computing device 250B to the private/public key associated with the smart contract may be registered.

The smart contract may be configured to hold the data transfer from the private/public key associated with lightweight node computing device 250B until fulfillment of certain predetermined criteria hardcoded into the smart contract is achieved. The smart contract may be configured such that it serves as an intermediate arbiter between entities within the decentralized P2P network 270 and may specify details of a dual data transfer between entities.

Lightweight node computing device 250A may also request a smart contract operation related to blockchain 226 in decentralized P2P network 270, which may conclude the dual data transfer between a private/public key associated lightweight node computing device 250A and a private/public key associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract operation network function request. The smart contract operation network function request may further include the public key associated with the smart contract. Processors of lightweight node computing device 250A may execute digital signature algorithms to digitally sign the smart contract operation network function request with the private key associated with lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing the smart contract operation network function request. After the new block has been added to blockchain 226, the smart contract operation transaction network function request 290 may be considered to be executed and the data transfer from the private/public key associated with lightweight node computing device 250A to the private/public key associated with the smart contract may be registered.

When the smart contract receives the data value from each of lightweight node computing device 250A and lightweight node computing device 250B, the smart contract may transfer the data value from lightweight node computing device 250A to lightweight node computing device 250B and the data value from lightweight node computing device 250B to lightweight node computing device 250A.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockhain 226 and network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 270 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3B:
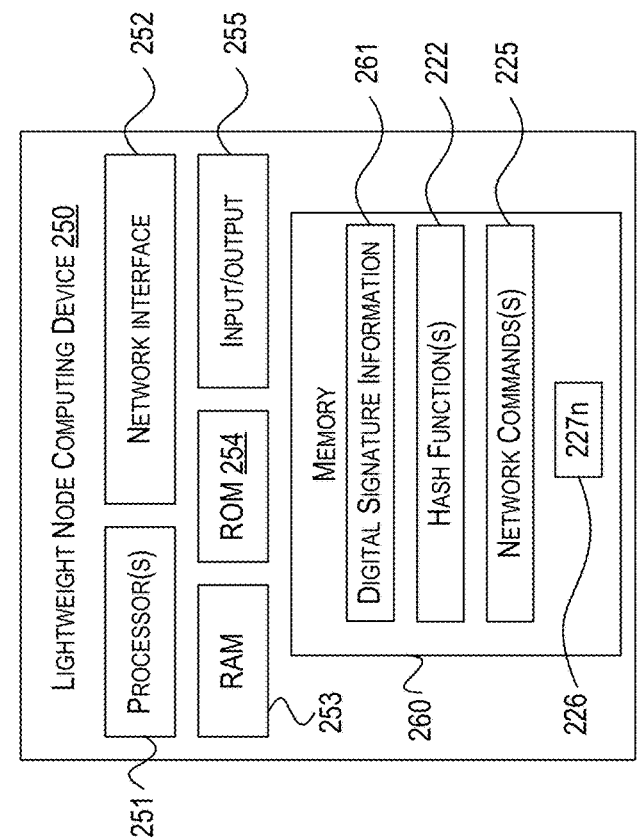
FIG. 3B depicts an illustrative example of a lightweight node computing device that may be used in accordance with one or more illustrative aspects described herein
Figure 3A:
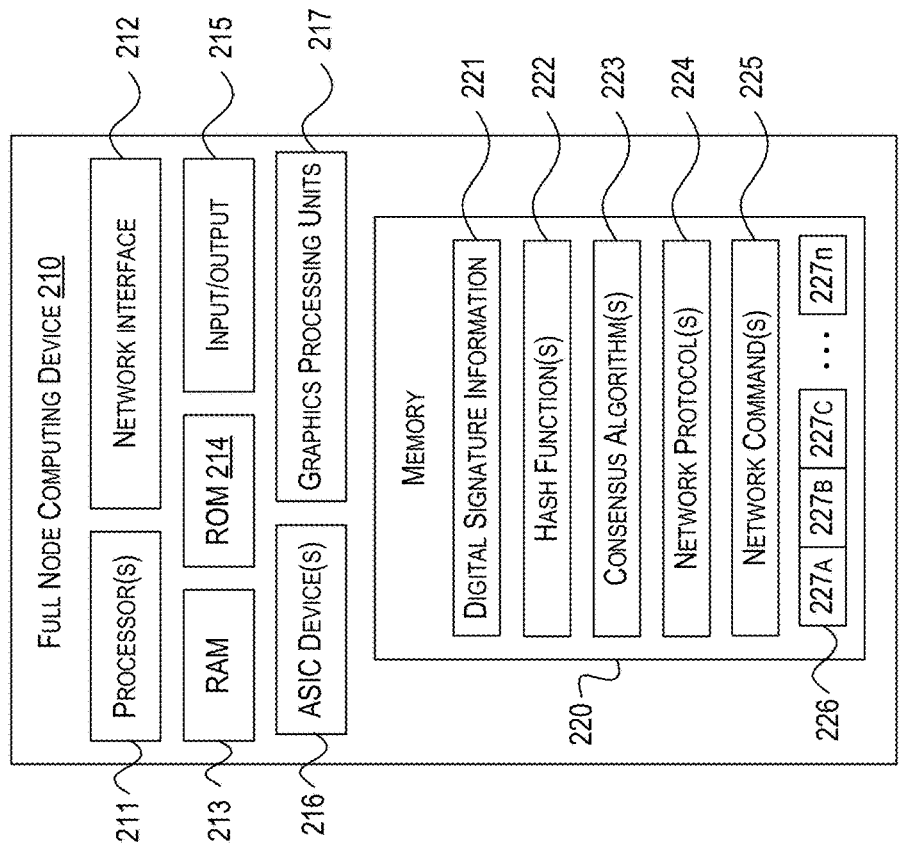
FIG. 3A depicts an illustrative example of a full node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, etc.), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software, etc.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, etc.), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Enterprise Data Management

Having discussed blockchain techniques above with respect to FIGS. 1-3, discussion will now turn to features directed to enterprise data management using blockchains. As introduced above, a form may be established with a plurality of data fields. A computing device, upon receipt of data (e.g., an address, a file, a telephone number, etc.) from a data field of the form, may determine a blockchain corresponding to the data field. Such a blockchain may comprise a plurality of blockchain entries containing information corresponding to, for instance, data lineage, data privacy/security, data validation rules, or the like. The computing device may analyze the entries and determine whether to store data based on, for instance, whether the computing device can verify the origin and movement of the data throughout an enterprise. If the computing device determines to transfer the stored data to a second computing device, it may create a corresponding blockchain entry and cause it to be added to the blockchain. The computing device may then transfer the data to the second computing device. Thus, according to some aspects of the present disclosure, blockchain entries may be created corresponding to the movement or processing of data, thereby allowing other computing devices to determine information (e.g., data lineage, privacy, etc.) of the data.

Figure 4:
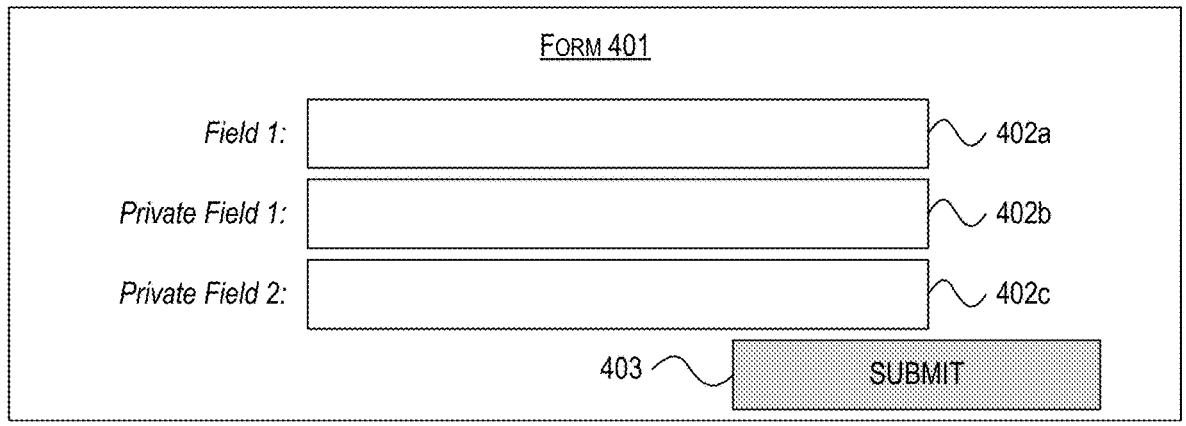
FIG. 4 depicts an illustrative example of a form with one or more data fields in accordance with one or more illustrative aspects described herein.

FIG. 4 depicts an illustrative form 401 in which data which may be entered and ultimately transmitted by a user to an enterprise device. Form 401 may be any method in which data may be acquired. As depicted in FIG. 4, form 401 is a form with data fields 402a-402c which may be provided, for example, on a website or the like. Form 401 may be a single or series of prompts manually entered by a user, for example. Form 401 may comprise data already acquired from external data sources. For instance, form 401 may be a form with a user's name already filled in a first data field, but with a blank data field corresponding to the user's height. As another example, form 401 may be a computer program (e.g. a spreadsheet application, a web application, or the like) which prompts the user for information based on information already available to the computer program.

Form 401 comprises three data fields 402a-402c. A form may have any number of data fields; FIG. 4 depicts three for simplicity. Data fields 402a-402c may receive data in any format. For instance, data fields 402a-402c may receive data in the form of an alphanumeric string, computer input (e.g., a computer file), biometric data (e.g., fingerprint or iris information) and/or any suitable format as desired for a given application. The nature of the manner in which data is received by data fields 402a-402c may depend on the nature of form 401. For instance, form 401 may be part of software executing on a point-of-sale device, and information may be entered by a store cashier asking the user questions and typing the responses into the form.

Data fields may be categorized, according to some aspects. As depicted in FIG. 4, fields 402b and 402c are designated as private fields such that the information may be sensitive. A private field may be, for instance, a password field or biometric data field such that data must be handled using a security policy. Categorization need not relate to privacy, however. A data field may be categorized as financial (e.g., a data field where a user enters a price), as relating to location (e.g., an address), as relating to contact information (e.g., a telephone number or e-mail address), or the like.

Data fields may be validated, by form 401 or after submission using form 401, based on categories associated with the data fields. An enterprise may maintain one or more validation rules for a category or for a type of data. For instance, an enterprise may maintain rules which ensure that phone number data remains consistent (e.g., all phone numbers entered do not use dashes) or which remove malicious code (e.g., input associated with an attempt at Structured Query Language ("SQL") injection attack). Validation may be performed using appropriate program code, such as regular expression patterns.

Form 401 may be submitted using submission button 403. Implementations of form 401 need not use a submission button 403 to submit data fields 402a-402c. Any method of transmitting information from data fields 402a-402c to an enterprise may be used in accordance with the features described herein.

An example of one implementation of form 401 is provided herein. Form 401 may be a portion of Hypertext Markup Language ("HTML") page for an online auction. Form 401 may comprise input fields 402a-402c. Each of data fields 402a-402c may be an input field in HTML with a different name, which may in turn be categorized differently. For instance, data field 402a may be a name field accepting any alphanumeric entry, data field 402b may be a bid amount field which only allows for the entry of numbers with up to two decimal places, and data field 403b may be a biometric data field accepting only fingerprint data. A user wishing to place a bid on an item may enter their name into field 402a, a bid amount into field 402b, and may, using a fingerprint scanner on the computing device accessing form 401, enter fingerprint data into field 402c. The user may then submit the form using submission button 403, causing a Hypertext Transfer Protocol ("HTTP") command (e.g., a GET or POST verb).

Figure 5:
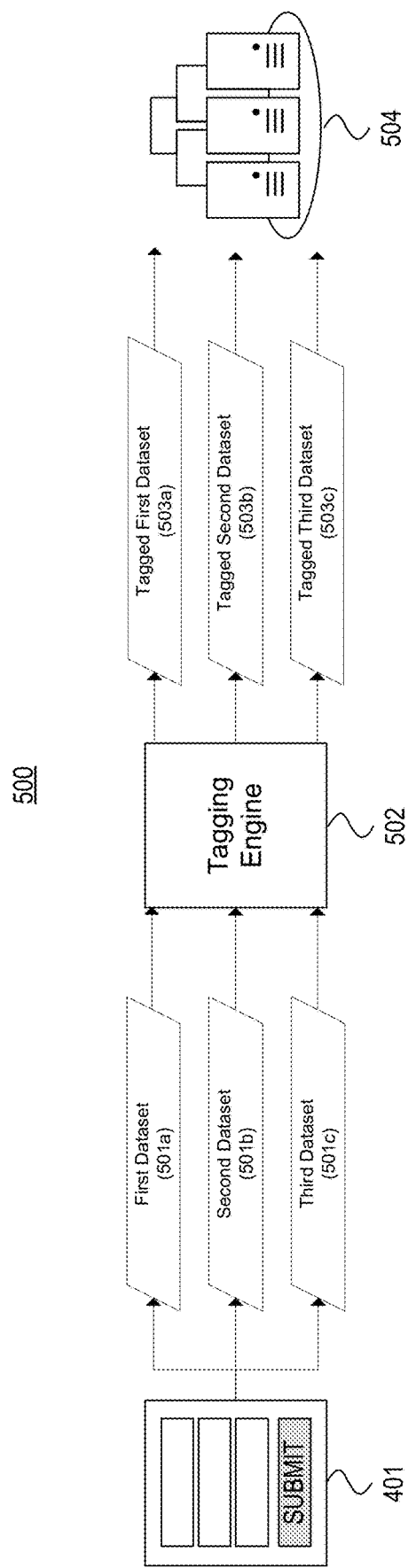
FIG. 5 depicts an illustrative example of a flow of data from a form with data fields through a tagging engine and to a plurality of computing devices.

FIG. 5 depicts, in an enterprise network 500, a flow of data from form 401 into networked systems 504.

Data received from form 401 may, as described with regard to FIG. 4, comprise a number sets of data 501a-501c corresponding to data fields 402a-402c. As used herein, a set of data may comprise any data and/or data structure, and is used in this disclosure to suggest an arbitrary separation between different sets of data. For example, a set of data may be a Boolean value, such as a "0" or a "1," or may comprise gigabytes of video data. The data may be separated by a computing device (not pictured) in any logical manner, and may be processed into separate sets of data 501a-501c by one or more computing devices (not pictured). For instance, first set of data 501a may be a first name, second set of data 501b may be a middle initial, and third set of data 501c may be a third name. As another example, a first set of data 501a may comprise a full name and address, a second set of data 501b may be a monetary value, and a third set of data 501c may be biometric data comprising fingerprint data and iris scan data. Sets of data may be separated by time: a first set of data 501a may be a first packet transmitted at a first time, a second set of data 501b may be a second packet transmitted at a second time, and a third set of data 501c may be a third packet transmitted at a third time.

Tagging engine 502 may be configured to receive data from form 401 and associate such data with one or more tags. Tagging engine 502 may be a separate computing device or all or a part of another computing device (e.g., a network device in networked systems 504). As used herein, a tag may be information identifying the nature and/or content of data, as well as information indicating conditions related to the data. For example, tags associated with the data may comprise rules relating to data privacy, data processing, data validation, and/or data transfer as discussed further below. Illustrations of tags are provided below.

A tag may be a classification of all or a portion of data. A tag may specify that a specific series of alphanumeric characters in the data corresponds to, for example, a home address or website. A tag may specify that a series of numbers corresponds to a phone number such that the first three numbers correspond to an area code. A tag may simply be an arbitrary name for the field.

A tag may describe properties of the data. A tag may specify a format (e.g., alphanumeric characters, binary, etc.) of the data. A tag may specify a maximum character length, alphanumeric characters used, or the like. For instance, a tag may specify that data is limited to 32 alphanumeric characters. As another example, a tag may specify that data comprises three signed integers, each with a range of −128 to 127.

A tag may correspond to a template that, when applied to data, segments the data into subsets of data. For example, a tag may specify that data comprises comma-separated values with columns corresponding to a first, middle, and last name such that, when subsequently processed, the columns may be identified and the last name may be extracted.

Tags associated with data may correspond to classifications assigned to a data field from which the data was retrieved. Tagging engine 502 may be configured to associate tags with data based on such classifications. For example, a data field classified as a phone number field may be associated, by the tagging engine, with a tags indicating that the field is a phone number, is moderately private, comprises numbers, is expected to be 10 numbers in a sequence, and may be formatted as "NNN-NNN-NNNN" or the like.

Tags may indicate a level of privacy associated with all or a part of the data. A tag may indicate that all or a part of data is, or should be, encrypted. A tag may suggest that all or a part of data comprises personally identifying information, healthcare information, biometric information, or the like. For instance, a user's auction bidding history may be tagged as extremely private, whereas a user's birthday and/or e-mail may be tagged as moderately private.

Tagging engine 502 may tag data by adding or modifying all or a part of data. For example, tagging engine 502 may add to data, or may modify an external database (not pictured) to indicate the tagging of such data.

The tagged datasets 503a-503c may be ultimately transmitted via the tagging engine 502 to networked systems 504. Enterprise network 500 may comprise tagging engine 502 and form 401 such that the division between form 401, tagging engine 502, and networked systems 504 may be logical rather than physical. For example, form 401 and tagging engine 502 may be the same or separate programs executing on a web server, and the same web server may store tagged datasets 503a-503c at networked systems 504. Enterprise network 500 may additionally or alternatively comprise a plurality of servers such that form 401 executes on a first device, tagging engine 502 executes on a second device, and networked systems 504 may comprise a plurality of third devices.

In some implementations, enterprise network 500, including form 401, tagging engine 502, and networked systems 504 need not be located in the same location or operated by the same organization or enterprise. For instance, form 401 may execute on a first computing device run by a first organization (e.g., a web server run by a car showroom), tagging engine 502 may execute by a second device run by a second organization (e.g., a data processing server run by a web hosting company), and networked systems 504 may comprise a plurality of third computing devices run by a third organization (e.g., servers run by a car manufacturer).

Figure 6:
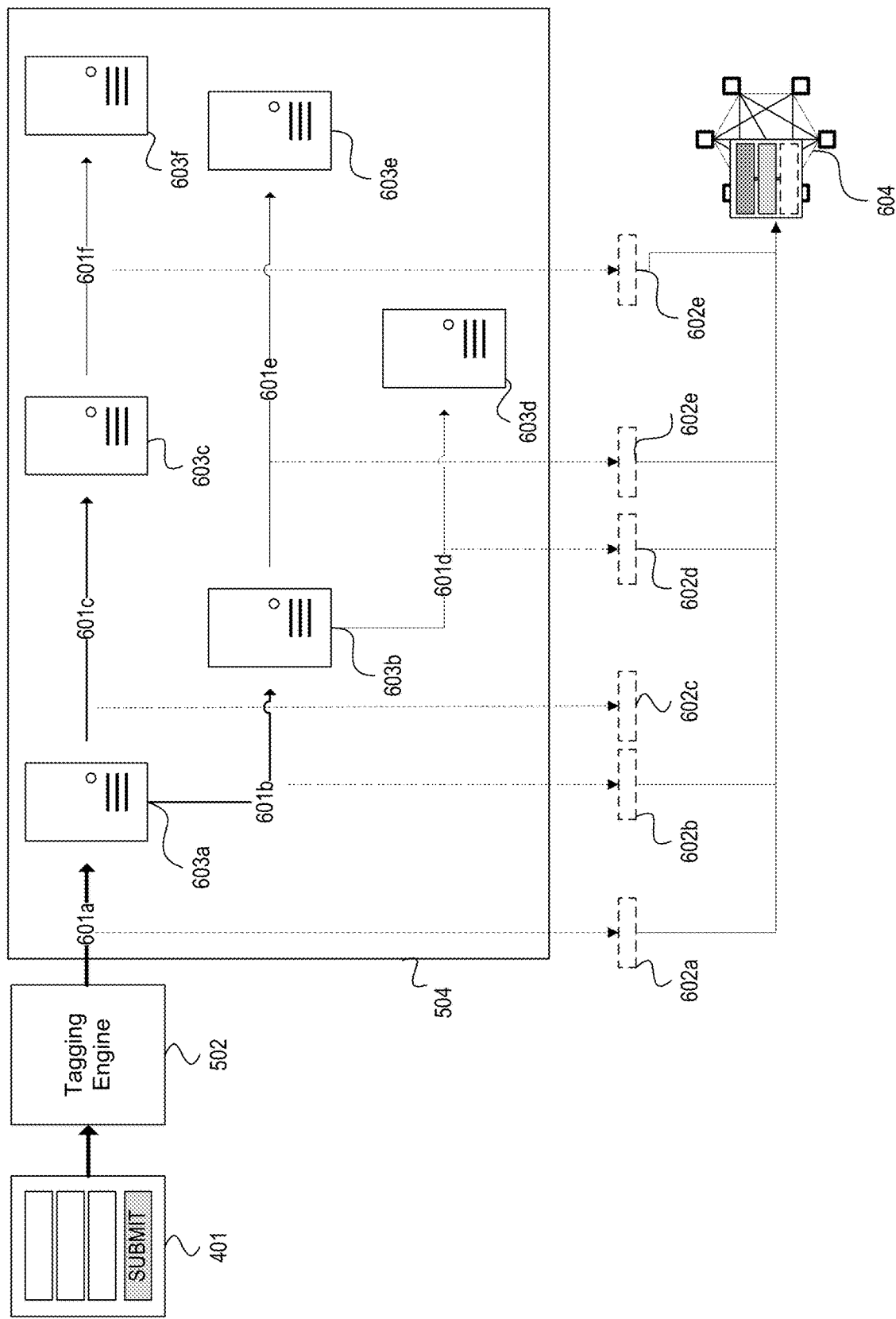
FIG. 6 depicts an illustrative example of a flow of data through a plurality of computing devices, including creation of blockchain entries corresponding to the flow of data.

FIG. 6 depicts the flow of data from form 401 through tagging engine 502 and to networked systems 504.

Networked systems 504 may comprise a plurality of enterprise devices 603a-603f. Enterprise devices 603a-603f may be any computing devices which may store, process, or otherwise handle any portion of data. As detailed with respect to networked systems 504 in FIG. 5, enterprise devices 603a-603f may be operated by the same and/or different organizations. For instance, enterprise device 603f may be operated by an entirely different organization unrelated to the organization operating enterprise device 603c, such that communications may occur over the Internet or the like.

Data received by an enterprise device, such as enterprise device 603a, may be processed by the enterprise device. For example, processing may include validating (e.g., checking a received address and phone number data against a public directory). As another example, processing may include adding to or removing from data (e.g., removing dashes from a phone number, merging one set of data with another set of data, or the like). And as a further example, processing may be based on one or more rules associated with the data or the enterprise device (e.g., the enterprise device converts all incoming data into a SQL-friendly format, the enterprise device rejects e-mail addresses that do not contain a certain domain, or the like). Processing may comprise any operations which may be performed by the enterprise device with regard to data, but need not modify the data. For instance, an enterprise device may increment a counter for every set of data it receives, but need not change the data itself.

As illustrated in FIG. 6, data may be received from form 401 via tagging engine 502 and by a first enterprise device 603a. This device may then forward on all or a part of the received data to second enterprise device 603b and third enterprise device 603c. Third enterprise device 603c may transmit all or a part of its corresponding received data to sixth enterprise device 603f, and second enterprise device 603b may transmit all or a part of its corresponding received data to fourth enterprise device 603d and fifth enterprise device 603e.

Data may be communicated via communications 601a-601f, which may be any form of communication between enterprise devices 603a-603f. Enterprise devices 603a-603f may be on the same or separate networks but may be capable of communicating via, for example, physical interfaces such as Ethernet or fiber optic communications. In some implementations, some enterprise devices 603a-603f may be a form of storage kept disconnected from a network such that communication may comprise human intervention (e.g., writing to media storage, such as a Universal Serial Bus drive, and transferring, using the media storage, the data to a second enterprise device).

A simplified example of this illustrative flow is provided herein. First enterprise device 603a may receive, via communication 601a, data comprising a name, address, and phone number. The data corresponding to the name may be communicated, via communication 601c, to enterprise device 603c. Data on enterprise device 603c may be routinely backed up in cold storage (e.g. on tape drives) at enterprise device 603f such that communication 601f may comprise writing the data, including the received name, to permanent media (e.g., a tape drive) and inserting it into enterprise device 603f. The data corresponding to the address and phone number may be transmitted, from first enterprise device 603a and via communication 601b, to enterprise device 603b. Enterprise device 603b may process the received address and phone number by, for example, validating the data against an address and phone number database. Enterprise device 603b may then transmit the validated address, via communication 601e, to enterprise device 603e, and may transmit the validated phone number to enterprise device 603d via communication 601d.

Every processing or communication step involving data may be described in a blockchain entry 602a-602e. A blockchain entry may comprise information associated with data (e.g., what the data contains), communications between enterprise devices 603a-603f (e.g., communications 601a-601f), processing of data (e.g., that dashes in a phone number were removed), or the like. Illustrations of content which may be present in a blockchain entry are provided below.

A blockchain entry 602a-602e may comprise information associated with the movement of data in networked systems 504. A blockchain entry may, for instance, log communication of data when received (e.g., blockchain entry 602a logging the communication from tagging engine 502 to enterprise device 603a) or from one enterprise device to another (e.g., blockchain entry 602b logging the communication from enterprise device 603a to enterprise device 603b). A blockchain entry 602a-602e may contain information about the method of communication (e.g., via a network connection, manual transfer using rewritable media, or the like), a time or place of transfer (e.g., automatic transfer of all content from enterprise device 603a to enterprise device 603c every Monday, or upon request at a certain time), about user(s) associated with the request (e.g., that communication 601f was initiated by a server administrator), or the like.

A blockchain entry 602a-602e may comprise information associated with the processing of data in networked systems 504. A blockchain entry may, for instance, log how a server may modify data (e.g., formatting comma separated values into a SQL table), may remove from data (e.g., removing dashes from a phone number), may add to data (e.g., merging two sets of data), may react to a data (e.g., incrementing a counter for every e-mail address set of data received), or the like. A blockchain entry 602a-602e need not describe the processing of data with any level of particularity: a blockchain entry may simply describe the processing operation (e.g., "removes all dashes"), may provide exact steps of how data was modified (e.g., providing the regular expression used to modify the data), or the like.

A blockchain entry 602a-602e may comprise information associated with the validation of data in networked systems 504. A blockchain entry may, for instance, indicate how an enterprise device may validate data using one or more validation rules. For instance, a network device may be configured to confirm that phone numbers are valid, and a corresponding blockchain entry may indicate which steps were taken by the network device to confirm that phone numbers are valid.

A blockchain entry 602a-602e may comprise information associated with tags corresponding to data. A blockchain entry 602a-602e may indicate which tags are applied to data or the like. Enterprise devices 603a-603f may add, remove, or modify tags during processing based on tagging policies, and blockchain entries 602a-602e may comprise information associated with such tagging policies, including such additions, removals, or modifications. For instance, a blockchain entry (e.g., blockchain entry 602c) may log that an enterprise device processes an address to keep only a six-digit zip code and modify a corresponding tag of the data to indicate that the formerly alphanumeric data is now only six-digit numeric data. As another example, a blockchain entry may indicate that certain tags (e.g. a tag associated with data suggesting the originating organization of the data) were removed by a network device.

A blockchain entry 602a-602e may contain historical information associated with data. For instance, a blockchain entry may comprise a log of all recent communications of data (e.g., over the last 24 hours), or may comprise a lot of all recent tagging changes associated with data. In this manner, a blockchain entry need not be created for every action relating to data.

A blockchain entry 602a-602e may comprise information corresponding to a privacy level of data. Enterprise devices may store data based on the privacy level (e.g., by encrypting received data, deleting data after a certain period of time, or the like). For instance, data may comprise highly sensitive information (e.g., health information), and a blockchain entry may indicate that such data must be encrypted at all times. An enterprise device may be configured with one or more privacy rules which define actions corresponding to different privacy levels of different sets of data. For example, a privacy level of a home address may correspond to a privacy rule requiring basic encryption, whereas a privacy level of a password may correspond to a second privacy rule requiring advanced encryption.

A blockchain entry 602a-602e may be made to indicate information associated with enterprise devices or data, such as indicating that an enterprise device was compromised, indicating that a certain set of data may be unreliable, or the like. A network management device (not pictured) may determine that an enterprise device has been compromised and cause a blockchain entry to be created indicating that the device has been compromised. In turn, enterprise devices which have data from the compromised enterprise device may delete such data or place such data in quarantined memory.

Blockchain entries 602a-602e may be automatically created or may be manually created. A blockchain entry may be created upon the establishment of a data flow between two enterprise devices such that a single blockchain entry may exist for repeated transmission of data between two enterprise devices. Additionally or alternatively, a blockchain entry may be created for every instance data is communicated between two enterprise devices. A blockchain entry may be created every time a request is made, to an enterprise device, for data (e.g., every time a user uses a program executing on enterprise device 603a to access the data on enterprise device 603a). A blockchain entry may be manually created, such as by a user executing a program on a computing device.

Blockchain entries 602a-602e may be added to the blockchain 604. While one blockchain is depicted in FIG. 6, a plurality of blockchains may exist across one or a plurality of decentralized P2P networks. For example, a plurality of blockchains may be configured to each store information corresponding to a different format of data, a different data field of a form, or the like. As discussed above, a blockchain may be a chronological linkage of blockchain entries which store data records relating to the decentralized computing system. Blockchain entries 602a-602e may be added to the blockchain such that the blockchain may comprise a decentralized ledger of all actions to data occurring amongst networked systems 504.

Networked systems 504 may be configured such that addition of blockchain entries to the blockchain is mandatory. Enterprise devices may be configured to not be capable of processing, transmitting, inspecting, or otherwise handling data without approval (e.g. from the decentralized P2P network) that a corresponding blockchain entry has been added to the blockchain. For instance, data may be encrypted such that data may not be unencrypted without keys corresponding to such approval. In turn, the distributed P2P network managing the blockchain may refuse to provide approval based on determining that the blockchain entry corresponds to an action regarding data that violates a security policy. For example, enterprise device 603c may attempt to transmit private information to enterprise device 603f and submit corresponding blockchain entry 602e to the blockchain. The distributed P2P network may determine to not approve the transaction corresponding to the blockchain entry based on a security policy associated with the private information. In turn, the distributed P2P network may add the blockchain entry to the blockchain but not provide approval to enterprise device 603c or may transmit a rejection to enterprise device 603c.

An enterprise device may store data in temporary memory and move the data to long-term storage upon determining that a blockchain entry corresponding to the data is on the blockchain. An enterprise device may be configured to delete received data if a corresponding blockchain entry is not located in a certain time period or on a certain blockchain. In this manner, an enterprise device may be capable of receiving and inspecting received data, but need not use limited storage resources to store the data until a corresponding blockchain entry is located.

Blockchain 604 may be available to enterprise devices 603a-603f such that the enterprise devices may process data based on the blockchain. Enterprise devices may be operated by different organizations such that an enterprise device may use blockchain 604 to determine the format of the data or which processes may have already been performed on the data. For instance, enterprise device 603c may receive data from enterprise device 603a and, based on the blockchain, determine that the data has been processed using a MD5 hash function three times. On that basis, if enterprise device 603c requires that the data be processed by the MD5 hash function four times, it need only process the data using a MD5 hash function one additional time.

Enterprise devices 603a-603f may determine, based on blockchain 604, a level of security of data. Data may contain confidential information or the like. Enterprise devices 603a-603f may determine, using the blockchain, that data may have come from untrustworthy sources, may have been transmitted through compromised or otherwise untrustworthy enterprise devices, or the like. Additional blockchain entries 602a-602e may be added to the blockchain to indicate that an enterprise device may be compromised. The decentralized nature of the blockchain may advantageously prevent the compromised enterprise device (e.g. enterprise device 603b) from attempting to mask its compromised status. For example, enterprise device 603b may be compromised, and enterprise device 603e may determine, using the blockchain, that data received was, at some point, handled by a compromised device (e.g. enterprise device 603b) and therefore discard the data on that basis.

Blockchain 604 may be used to determine inefficiencies relating to the communication of or processing of data. For instance, blockchain 604 may suggest that data originating at tagging engine 502 is processed and re-processed an undesirable number of times (e.g., that enterprise device 603a removes an area code from a phone number, enterprise device 603c looks it up and adds it again, and enterprise device 603f removes it again). A computing device, such as an enterprise device, may, in response to such efficiencies, establish or remove data flows. This process may also be performed to optimize data flow: the management computing device may analyze the blockchain, determine an optimized data flow based on the blockchain entries in the blockchain, and re-structure data flow between enterprise devices on that basis.

Blockchain 604 may be used to determine compliance with security and/or privacy policies associated with data. A computing device, such as an enterprise device, may determine, based on information in the blockchain, whether a blockchain entry suggests a security protocol violation. For instance, data comprising an individual's e-mail address may be properly accessed during the workday, but access to the e-mail address at night from a personal computing device in a foreign country may suggest that unauthorized access is occurring or has occurred. As another example, a blockchain entry indicating access, by a point-of-sale device in a store, of customer data at a time when the store is closed may prompt an automated call to the store.

Blockchain 604 may be public or private. For instance, networked systems 504 may be a government database storing citizens' personal information. The distributed P2P network may comprise a number of public computers, including citizens' computers. Enterprise device 603*a*, a government data server, may transmit personal information about citizens to enterprise device 603*c*, a device operated by a private agency. Enterprise device 603*a* may cause addition of a blockchain entry (e.g., blockchain entry 602*c*) to the blockchain. In this manner, the public may be informed that the transfer occurred.

Figure 7:
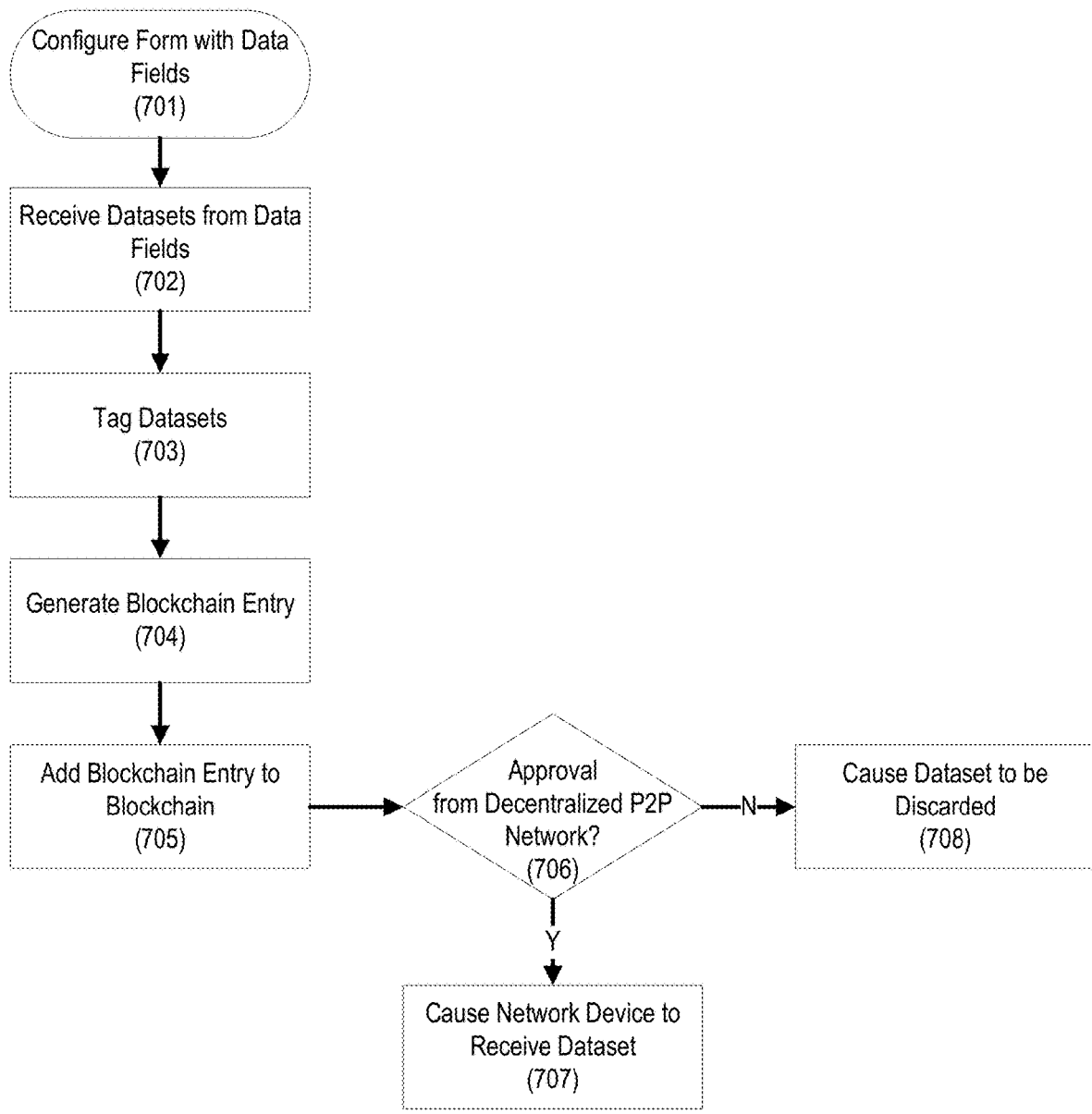
FIG. 7 depicts an illustrative example of a flowchart from data intake to the plurality of computing devices and including the creation of a blockchain entry.

FIG. 7 is an illustrative flow chart of how data may be received from a form (e.g., form 401) and into a network device. With regard to FIG. 6, FIG. 7 is an illustration of the flow from form 401 through tagging engine 502 and to enterprise device 603*a*, with a focus on communication 601*a* and blockchain entry 602*a*.

In step 701, a form (e.g., form 401) is configured. As described with regards to FIG. 4, the form may be configured with one or more data fields to receive data. As an example, form 701 may be an electronic form comprising data fields asking for a first, middle, and last name, each which may be referred to as different data or a different set of data (e.g., as a series of alphanumeric characters).

In step 702, data may be received from the data fields of the form. Step 702 may involve a HTTP GET or POST command corresponding to an HTML form or the like. Receipt of data from the data fields may involve the creation of metadata corresponding to the data, such as information about the size of the data, the time the data was acquired, and the like.

In step 703, the data may be tagged. As described with regard to FIG. 5 and tagging engine 502, tagging may comprise associating tags with data such that, for example, a tag may describe what the data is (e.g., a tag may indicate that the data is the full name of a subscriber of a magazine), a tag may describe a level of privacy of the data (e.g., a tag may indicate that the name is extremely private because of the reputation or content of the magazine), or the like.

In step 704, a blockchain entry may be created corresponding to the intake of data. The blockchain entry may be created by a receiving network device (e.g., to log receipt of the data), may be created by tagging engine 502, may be created by an intermediate computing device, or the like. As indicated above with regard to FIG. 6, a blockchain entry may be created when, for example, data enters networked systems (e.g., blockchain entry 602*a*), when data moves between enterprise devices (e.g., blockchain entry 602*b*), and the like.

The blockchain entry created in step 704 may comprise data lineage information, such as when the data was received, how the data was received, when the data was tagged, and the like.

The blockchain entry created in step 704 may comprise validation information, such as whether the data was validated (by the form, tagging engine, enterprise devices, or the like), and how the data was validated. For instance, if tagging engine 502 or another device is configured to check that all phone numbers are accurate, then such validation may be indicated in the blockchain entry.

The blockchain entry created in step 704 may comprise processing information, such as whether the data was processed (by the form, tagging engine, enterprise devices, or the like), and how the data was processed. For instance, if tagging engine 502 or another device is configured to hash a received value (e.g., a password) using MD5, then such processing may be indicated in the blockchain entry.

The blockchain entry created in step 704 may comprise an indication of a security level, such as an indication that the data requires encryption upon receipt by an enterprise device. Such an indication may cause the recipient enterprise device to encrypt the received data.

The blockchain entry created in step 704 may comprise data classification information. Data classification information may comprise information about tags associated with data. Data classification information may additionally or alternatively comprise classifications corresponding to the nature of the blockchain entry itself, such as an indication of an organization from which the data and/or blockchain entry originated.

In step 705, the blockchain entry may be added to the blockchain. As detailed above, the decentralized P2P system may be configured to retrieve blockchain entries and add the entries to the blockchain. The decentralized P2P system may be configured to add blockchain entries even if they are not properly formatted in order to provide an accurate depiction of all activity in networked systems 504. For instance, an empty blockchain entry may be nonetheless added to the blockchain because it may suggest the existence of a data security issue among networked systems 504.

In step 706, all or part of the networked systems 504 may determine whether the decentralized P2P systems have transmitted an approval corresponding to the blockchain entry. Decentralized P2P systems may transmit an approval to a computing device that generated the blockchain entry. Such an approval may comprise one or more keys which may be used to, for instance, process or communicate corresponding data. Additionally or alternatively, the computing device that created the blockchain entry may consider the successful addition of the blockchain entry to the blockchain as an approval.

In step 707, if approval is received, the computing device may cause a network device to receive data. If the network device is the computing device which created the blockchain entry (e.g., to log receipt of the data), the network device may store the received data. If a computing device (e.g., tagging engine 502) created the blockchain entry, then the computing device may cause transmission of the data to the network device and/or cause the network device to receive the data.

In step 708, if approval is not received, the computing device may cause the data to be discarded. Discarding may comprise deletion of the data, storing the data elsewhere (e.g., storage at a device outside of networked systems 504), storing the data in quarantine storage, or may comprise storing the data but preventing similar data from being received in the future.

While steps 707 and 708 illustrate steps in for a received data (e.g., step 702), the steps illustrated in FIG. 7 may be performed for future data transmissions. Steps 701-708 may be performed to establish a data flow from a form and to a network device such that, while no data may be received (e.g. step 707) or discarded (e.g. step 708), a blockchain entry may be created. In this manner, future blockchain entries need not be created: approval may have already been received from the decentralized P2P network.

Although steps 706 through 708 suggest the need for approval from a decentralized P2P network, approval need not be required in some implementations. For instance, data may be allowed to flow freely, and the blockchain may simply log data transmission. In such a circumstance, no approval need be required.

Figure 8:
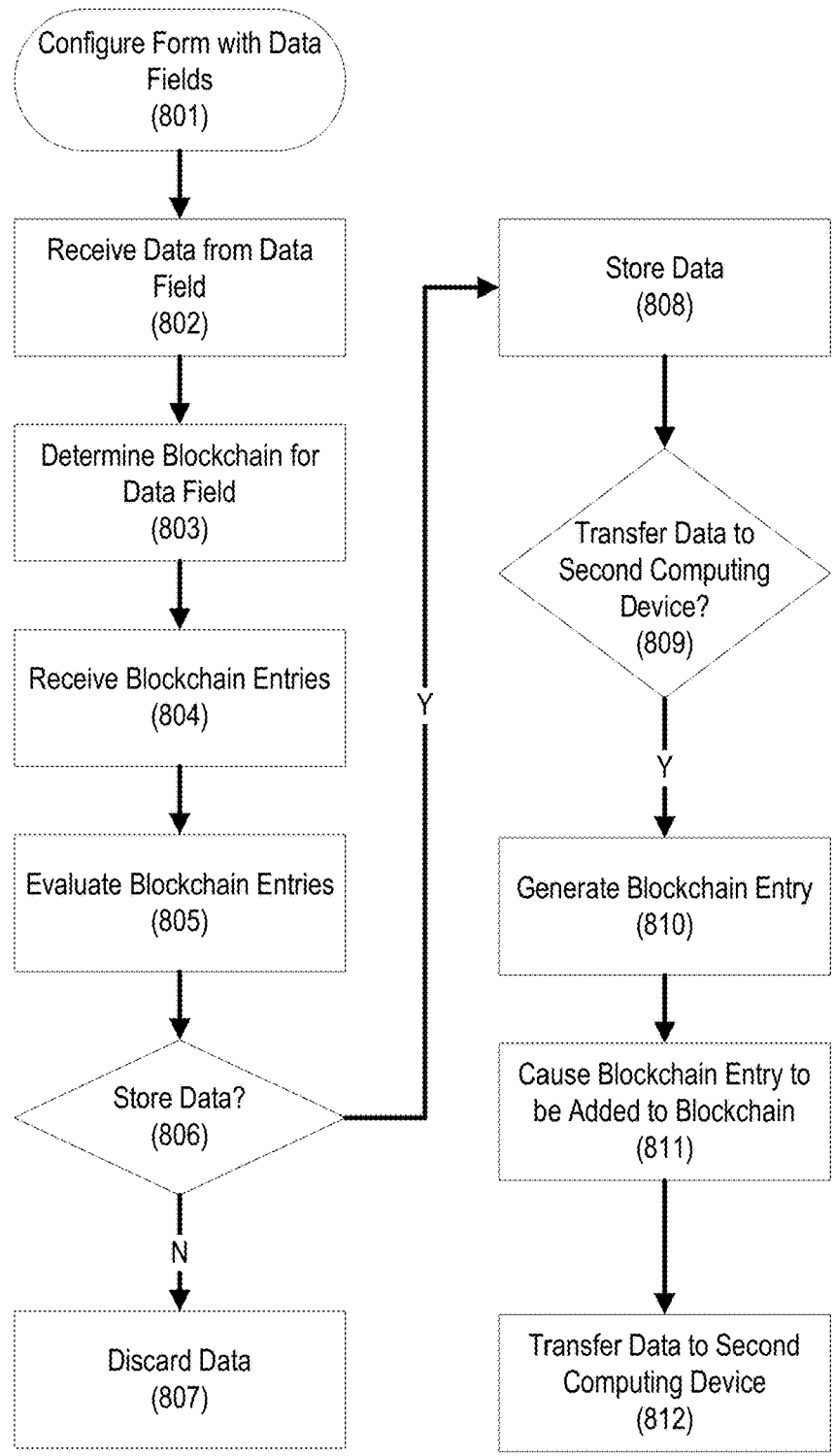
FIG. 8 depicts an illustrative example of a flowchart wherein data flows from a form to a computing device and to a second computing device.

FIG. 8 depicts an illustrative flow chart of steps which may be taken in accordance with various features of the subject matter.

In step 801, a form with data fields may be configured. As detailed above, and with particular regards to FIG. 4, the form may comprise a plurality of data fields, each associated with a respective blockchain.

In step 802, a computing device may receive data via a data field of the form. Receipt of data from a data field (e.g., data field 402a) need not be direct but may be handled by one or more intermediaries, such as a person (e.g., a data entry clerk), a computing device (e.g., a web server), or the like.

In step 803, a blockchain may be determined corresponding to the data field from which the data is received. The blockchain may correspond to the data field itself, the form itself, or the like. For example, the data field may be an address field, and the blockchain may be configured to directly track data lineage of the address information from the data field and throughout an enterprise. The blockchain may store data lineage information for a plurality of data fields, forms, or the like.

In step 804, the computing device may receive blockchain entries of the blockchain. Receipt may entail requesting, from one or more computing devices, blockchain entry information. As the blockchain may be private, such receipt may include authentication. Each blockchain entry may correspond to a different step of data lineage (e.g., each successive transmission of data in an enterprise), modifications made to data (e.g., a regular expression operation on the data), or the like. Such blockchain entries may comprise rules, such as a data lineage rules (e.g., where data may be transferred) or the like. Although the computing device may receive the blockchain entries in this manner, in some implementations the blockchain entries and subsequent analysis may be handled by another computing device in communication with the computing device.

In step 805, the blockchain entries received may be evaluated. A data flow and/or data lineage may be determined based on information in blockchain entries. A security level may be determined based on security indications in blockchain entries. Information about data modification may be determined based on indications of data modification in the blockchain entries. Inferences may be made based on information in the blockchain entries: for example, a computing device may determine a logical inconsistency in data lineage information in blockchain entries and determine that a security breach may have occurred or that one or more computing devices may be malfunctioning.

In step 806, based on the analysis of blockchain entries, the computing device may determine whether to store the data. Data may be stored based on the privacy level meeting a threshold, based on data lineage and/or data flow being determined appropriate, or the like. For instance, a computing device may fail to store data if it cannot be directly attributed back to its origin, if the likely validity of the data fails to meet a threshold, if the data flow has one or more gaps, if the data has been processed, or the like.

In step 807, and if the computing device has determined to not store the data, the computing device may discard the data. For instance, potentially compromised data may be refused to prevent compromise of the computing device.

In step 808, and if the computing device has determined to store the data, it may store the data. Storing the data may comprise moving the data from temporary to long-term memory, requesting a copy of the data, or the like. For instance, receiving data in step 802 may comprise receiving an indication of a data set, and storing the data in step 808 may comprise requesting and receiving the entire data set.

In step 809, the computing device may determine whether to transfer the data to a second computing device. This determination may be responsive to receiving a request for the data from the second computing device, an instruction to send the data to the second computing device, or the like. For example, the second computing device may request the data from the first computing device using a standard HTTP protocol.

In step 810, if the computing device has determined to transfer the data, it may generate a blockchain entry corresponding to the transfer. The blockchain entry may comprise an indication of the computing device (e.g., the sending computing device), the second computing device (e.g., the receiving computing device), or the like. The blockchain entry may comprise information about how the computing device received the data, information associated with processing of the data by the computing device, security information corresponding to the data, or the like. Generating the blockchain entry may comprise sending information to a blockchain computing device for processing.

In step 811, the computing device may cause the blockchain entry to be added to the blockchain. The computing device need not itself add the blockchain entry to the blockchain, but may cause the entry to be added by, for example, transferring the blockchain entry to another computing device. For instance, the second computing device receiving the data from the computing device may cause the blockchain entry to be added to the blockchain. As another example, the computing device may cause a third computing device that manages the blockchain to add the blockchain entry to the blockchain, as described further herein.

In step 812, the computing device may transfer the data to the second computing device. The transfer may be of all or a portion of the data requested. The data transfer may be conditioned on the successful addition of the blockchain entry to the blockchain such that, should the blockchain entry not be added to the blockchain, either or both the computing device or the second computing device will refuse the transfer. The updated blockchain, reflecting the newly added blockchain entry indicating the transfer of the data from the first computing device to the second computing device, may thus accurately track the data lineage of the transferred data.

Figure 9:
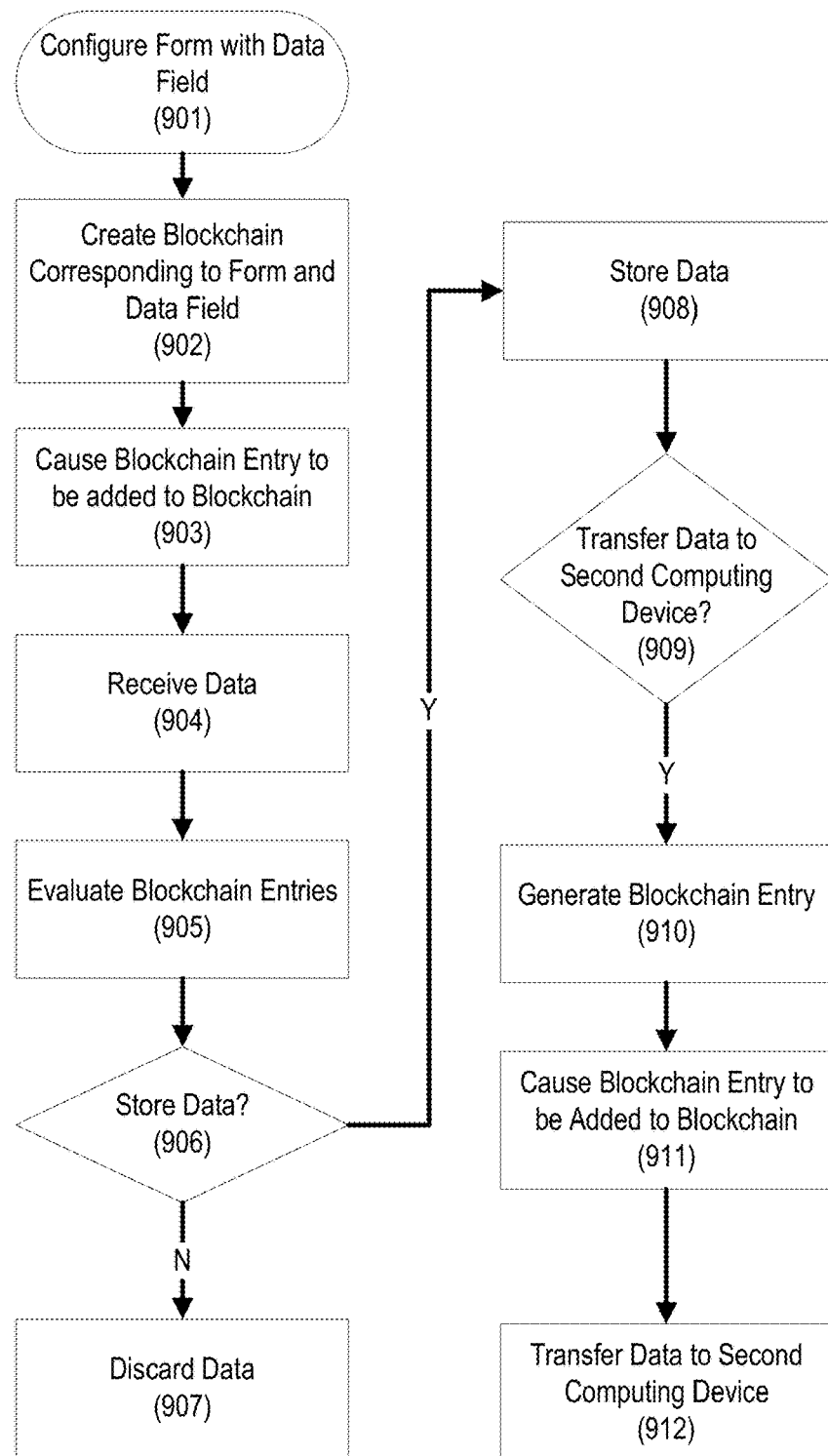
FIG. 9 depicts an illustrative example of a flowchart from establishing a form and a blockchain to receipt, by a computing device, of data from a data field of the form.

FIG. 9 depicts another flow chart illustrating steps which may be taken in accordance with the features herein.

In step 901, as with step 801, a form with data fields may be configured. As detailed above, and with particular regards to FIG. 4, the form may comprise a plurality of data fields, each associated with a respective blockchain.

In step 902, a blockchain may be created. The blockchain may correspond to a data field of the form and the form, or the like. Creation of a blockchain may be accomplished using any appropriate method using the blockchain protocols discussed above. For instance, a blockchain may be created amongst a plurality of enterprise devices, a blockchain may be established amongst established blockchain computing devices outside the enterprise, or the like. The blockchain may correspond to data fields of the form. For instance, a field of the form generated in step 901 may correspond to a phone number, and the blockchain generated in step 902 may be a phone number data lineage blockchain or the like.

In step 903, the computing device may cause a blockchain entry to be added to the blockchain. The blockchain entry may correspond to the configuration of the form with a data field such that the blockchain entry is the first data lineage entry for data received via the data field. The entry may indicate one or more validation rules associated with the data (e.g., that the data should be alphanumeric, only so many characters long, or the like), data lineage rules associated with the data (e.g., only to enterprise devices), privacy rules associated with the data (e.g., that only devices of a certain security level can handle the data), or the like.

The blockchain entry created in step 903 may indicate the first hop of data from a computing device executing a form to an enterprise device. For instance, the form may execute on a web server and transfer data to an enterprise device. A first blockchain entry may be generated corresponding to this transfer such that the blockchain may have a starting point from which to track future transmission or modification of the data. Intake of data may comprise generation of a plurality of blockchain entries, such as a first blockchain entry corresponding to data lineage and a second blockchain entry corresponding to data privacy.

In step 904, a computing device may receive data via a data field of the form. The computing device need not request the data, but may simply receive an indication of the data. For example, the computing device may receive metadata associated with data ready for transfer.

In step 905, the computing device may evaluate blockchain entries of the blockchain corresponding to the data field. Because step 905 may be later than step 903, there may be more than one blockchain entry corresponding to the data field in the blockchain. Evaluation may entail analysis of all or a part of the blockchain: for instance, the computing device may retrieve only blockchain entries relating to data lineage, or the like.

In step 906, based on the evaluation of blockchain entries, the computing device may determine whether to store the data received. As with step 806 of FIG. 8, this may comprise evaluating indications of privacy against a threshold, data lineage information, or the like.

In step 907, if the computing device has determined to not store the data, it may discard the data.

In step 908, if the computing device has determined to store the data, it may store the data. For example, and as indicated with regard to step 808 of FIG. 8, the computing device may transfer the data from temporary storage to long-term storage, or may request the full data from a data source.

In step 909, the computing device may determine whether to transfer the data to a second computing device. This step may be similar to step 809 of FIG. 8. Though both FIGS. 8 and 9 indicate transferring data may occur after storing data, the computing device need not store data in long term storage to transfer the data. For instance, merely a pointer to data may be transferred.

In step 910, if the computing device has determined to transfer the data, it may generate a blockchain entry corresponding to the transfer. This step may be similar to step 810 of FIG. 8. This blockchain entry may correspond to the blockchain entry generated in step 903. For instance, the blockchain entry generated in step 903 may be a first blockchain entry, and the blockchain entry generated in step 910 may be a second blockchain entry referencing the first blockchain entry.

In step 911, the computing device may cause the blockchain entry to be added to the blockchain. This step may be similar to step 811 of FIG. 8 and/or may comprise similar steps as that of step 903.

In step 912, the computing device may transfer the data to the second computing device. This step may be similar to that of step 812 in FIG. 8. The transfer may be of only a portion of the data stored in step 906 or the data received in step 904. For instance, the computing device may receive a name and address in step 904, store only the address in step 906, and transfer only a zip code in step 912.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a first computing device, first data corresponding to a first data field, wherein the first computing device operates as a full node in a decentralized peer-to-peer system;
   determining a blockchain corresponding to the first data field, wherein the blockchain comprises a plurality of blockchain entries corresponding to data lineage of the first data field, and wherein each blockchain entry corresponds to a different step of data lineage including each successive transmission of data in the first data field;
   evaluating the plurality of blockchain entries in the blockchain, the corresponding different steps of data lineage and the first data, wherein the blockchain entries comprise information associated with the data lineage of the first data in the first data field, wherein evaluating the plurality of blockchain entries in the blockchain, the corresponding different steps of data lineage and the first data further includes determining whether a logical inconsistency in the data lineage exists;
   determining, by the first computing device, whether to store the first data based on evaluating whether the first data can be attributed back to its origin;
   storing, by the first computing device, the first data in response to determining to store the first data;
   determining to transfer the first data to a second computing device from the first computing device;
   generating, by executing one or more first network protocols, a first blockchain entry corresponding to the first data field, wherein the first blockchain entry comprises a first indication of the first computing device as a sending computing device and a second indication of the second computing device as a receiving computing device;
   executing, by the first computing device, one or more second network protocols to broadcast the first blockchain entry to all full node devices in the decentralized peer-to-peer system;
   receiving, by the second computing device, the first blockchain entry;
   causing, by the second computing device identified by the second indication, the first blockchain entry to be added to the blockchain;
   determining whether the first blockchain entry was successfully added to the blockchain;
   responsive to determining that the first blockchain entry was not successfully added to the blockchain, refusing, by at least one of: the first computing device and the second computing device, a transfer of the first data; and
   responsive to determining that the first blockchain entry was successfully added to the blockchain, transferring, by the first computing device, the first data to the second computing device.

2. The method of claim 1, wherein determining that the first blockchain entry was successfully added to the blockchain includes receiving, by the first computing device and from a third computing device that manages the blockchain, an approval message in response to the first blockchain entry being added to the blockchain.

3. The method of claim 1, wherein the blockchain entries further comprise a privacy level associated with the first data field, and wherein evaluating the blockchain entries in the blockchain to determine whether to store the first data further includes determining that the privacy level meets a threshold.

4. The method of claim 1, wherein the at least one rule further corresponds to a validation rule associated with the first data field, and wherein evaluating the blockchain entries in the blockchain to determine whether to store the first data further includes determining that the first data meets the validation rule.

5. The method of claim 1, further comprising:
processing the first data based on a data modification policy, wherein the first blockchain entry further comprises a third indication of the data modification policy.

6. The method of claim 1, wherein evaluating the blockchain entries in the blockchain to determine whether to store the first data further comprises evaluating the blockchain entries to determine a likelihood that the first data is compromised, and wherein storing the first data is based on determining that the likelihood that the first data is compromised meets a threshold.

7. A computing device comprising:
one or more processors, and
memory storing instructions that, when executed by the one or more processors, cause the computing device to:
receive first data corresponding to a first data field;
determine a blockchain corresponding to the first data field, wherein the blockchain comprises a plurality of blockchain entries corresponding to data lineage of the first data field, wherein each blockchain entry corresponds to a different step of data lineage including each successive transmission of data in the first data field;
evaluate the plurality of blockchain entries in the blockchain, the corresponding different steps of data lineage and the first data, wherein the blockchain entries comprise information associated with the data lineage of the first data in the first data field, wherein evaluating the plurality of blockchain entries in the blockchain, the corresponding different steps of data lineage and the first data further includes determining whether a logical inconsistency in the data lineage exists;
determine whether to store the first data based on evaluating whether the first data can be attributed back to its origin;
store the first data in response to determining to store the first data;
determine to transfer the first data to a second computing device from the computing device;
generate, by executing one or more first network protocols, a first blockchain entry corresponding to the first data field, wherein the first blockchain entry comprises a first indication of the computing device as a sending computing device and a second indication of the second computing device as a receiving computing device;
execute one or more second network protocols to broadcast the first blockchain entry to all full node devices in a decentralized peer-to-peer system;
receive, by the second computing device, the first blockchain entry;
cause, by the second computing device identified by the second indication, the first blockchain entry to be added to the blockchain;
determine whether the first blockchain entry was successfully added to the blockchain;
responsive to determining that the first blockchain entry was not successfully added to the blockchain, refusing, by at least one of: the computing device and the second computing device, a transfer of the first data; and
responsive to determining that the first blockchain entry was successfully added to the blockchain, transfer the first data to the second computing device.

8. The computing device of claim 7, wherein determining that the first blockchain entry was successfully added to the blockchain incudes receiving, from a third computing device that manages the blockchain, an approval message in response to the first blockchain entry being added to the blockchain.

9. The computing device of claim 7, wherein the blockchain entries further comprise a privacy level associated with the first data field, and wherein evaluating the blockchain entries in the blockchain to determine whether to store the first data further includes determining that the privacy level meets a threshold.

10. The computing device of claim 7, wherein the blockchain entries further comprise a validation rule associated with the first data field, and wherein evaluating the blockchain entries in the blockchain to determine whether to store the first data further includes determining that the first data meets the validation rule.

11. The computing device of claim 7, wherein the instructions, when executed by the one or more processors, further cause the computing device to:
process the first data based on a data modification policy, wherein the first blockchain entry further comprises a third indication of the data modification policy.

12. The computing device of claim 7, wherein the instructions, when executed by the one or more processors, further cause the computing device to:
evaluate the plurality of blockchain entries to determine a likelihood that the first data is compromised, wherein storing the first data is further based on determining that the likelihood that the first data is compromised meets a threshold.

13. A system comprising:
a first computing device operating as a full node in a decentralized peer-to-peer system and having at least a first processor and memory storing computer-executable instructions, that, when executed by the at least a first processor, cause the first computing device to:
receive first data corresponding to a first data field;
determine a blockchain corresponding to the first data field, wherein the blockchain comprises a plurality of blockchain entries corresponding to data lineage of the first data field and wherein each blockchain entry corresponds to a different step of data lineage including each successive transmission of data in the first data field;
determine to transfer the first data to a second computing device from the first computing device;

generate, by executing one or more first network protocols, a first blockchain entry corresponding to the first data field, wherein the first blockchain entry comprises a first indication of the first computing device as a sending computing device and a second indication of the second computing device as a receiving computing device;

execute one or more second network protocols to broadcast the first blockchain entry to all full node devices in the decentralized peer-to-peer system;

the second computing device having at least a second processor and memory storing computer-executable instructions, that, when executed by the at least a second processor, cause the second computing device to:

receive the first data;

evaluate the plurality of blockchain entries in the blockchain and the first data, wherein the blockchain entries comprise information associated with the data lineage of the first data in the first data field, wherein evaluating the plurality of blockchain entries in the blockchain and the first data further includes determining whether a logical inconsistency in the data lineage exists;

store the first data based on determining that the first data can be attributed back to its origin;

receive, by the second computing device, the first blockchain entry;

cause, by the second computing device identified by the second indication, the first blockchain entry to be added to the blockchain;

the first computing device further including instructions that, when executed, cause the first computing device to:

determine whether the first blockchain entry was successfully added to the blockchain;

responsive to determining that the first blockchain entry was not successfully added to the blockchain, refuse, by at least one of: the first computing device and the second computing device, a transfer of the first data; and responsive to determining that the first blockchain entry was successfully added to the blockchain, transfer the first data to the second computing device.

14. The system of claim 13, wherein determining that the first blockchain entry was successfully added to the blockchain includes receiving, from a third computing device that manages the blockchain, an approval message in response to the first blockchain entry being added to the blockchain.

15. The system of claim 13, wherein the blockchain entries further comprise a privacy level associated with the first data field, and wherein evaluating the blockchain entries in the blockchain to determine whether to store the first data further includes determining that the privacy level meets a threshold.

16. The system of claim 13, wherein the blockchain entries further comprise a validation rule associated with the first data field, and wherein evaluating the blockchain entries in the blockchain to determine whether to store the first data further includes determining that the first data meets the validation rule.

17. The system of claim 13, wherein the first computing device further stores instructions that, when executed, cause the first computing device to:

process the first data based on a data modification policy, wherein the first blockchain entry further comprises a third indication of the data modification policy.

* * * * *